United States Patent
Scully et al.

(10) Patent No.: US 9,208,522 B2
(45) Date of Patent: Dec. 8, 2015

(54) SYSTEMS AND METHODS FOR CASH POSITIONING AND REPORTING

(75) Inventors: John E. Scully, Chicago, IL (US); Milton Santiago, Jr., Chicago, IL (US)

(73) Assignee: Bank of America Corporation, Charlotte, NC (US)

(*) Notice: Subject to any disclaimer, the term of this patent is extended or adjusted under 35 U.S.C. 154(b) by 177 days.

(21) Appl. No.: 12/183,844

(22) Filed: Jul. 31, 2008

(65) Prior Publication Data

US 2009/0319429 A1    Dec. 24, 2009

Related U.S. Application Data

(60) Provisional application No. 61/074,713, filed on Jun. 23, 2008.

(51) Int. Cl.
*G06Q 40/02* (2012.01)
*G06Q 40/00* (2012.01)

(52) U.S. Cl.
CPC .............. *G06Q 40/02* (2013.01); *G06Q 40/00* (2013.01); *G06Q 40/12* (2013.12)

(58) Field of Classification Search
CPC ........ G06Q 40/02; G06Q 40/00; G06Q 40/12
See application file for complete search history.

(56) References Cited

U.S. PATENT DOCUMENTS

| | | | | |
|---|---|---|---|---|
| 5,339,392 | A * | 8/1994 | Risberg ................ | G06F 3/0481 715/255 |
| 6,134,563 | A * | 10/2000 | Clancey et al. ............... | 715/210 |
| 6,381,587 | B1 | 4/2002 | Guzelsu | |
| 6,631,402 | B1 | 10/2003 | Devine et al. | |
| 6,665,704 | B1 * | 12/2003 | Singh ............................ | 709/203 |
| 6,997,380 | B2 | 2/2006 | Safaei et al. | |
| 7,669,145 | B2 * | 2/2010 | Arrouye et al. ............... | 715/853 |
| 7,680,877 | B2 * | 3/2010 | Regnier et al. ................ | 709/202 |
| 7,681,044 | B2 * | 3/2010 | Goto ............................. | 713/190 |

(Continued)

OTHER PUBLICATIONS

Microsoft Office System Customer Solution Case Study "Bank Gains Competitive Edge with a Unique XML-Based Desktop Liquidity Solution" Document published Feb. 2006.

(Continued)

*Primary Examiner* — Asfand Sheikh
(74) *Attorney, Agent, or Firm* — Weiss & Arons LLP; Michael A. Springs, Esq.

(57) ABSTRACT

Systems and methods for cash positioning and cash reporting are preferably provided. A system for cash reporting and cash positioning according to the invention may include a controller module and a web service module. The controller module may be adapted to receive a selection to update a data store. The web service module may be adapted to receive a call from the controller module. The call from the controller module may be sent in response to the selection to update the data store. The web service module may be configured to retrieve bank account information data in response to the call from the controller module.

11 Claims, 13 Drawing Sheets

(56) References Cited

U.S. PATENT DOCUMENTS

| | | |
|---|---|---|
| 7,685,032 B2 | 3/2010 | Zias et al. |
| 7,822,769 B2 | 10/2010 | Rohan et al. |
| 8,145,567 B2 | 3/2012 | Banaugh et al. |
| 2001/0029475 A1 | 10/2001 | Boicourt et al. |
| 2002/0095382 A1* | 7/2002 | Taoka et al. ............... 705/50 |
| 2002/0129054 A1 | 9/2002 | Ferguson et al. |
| 2003/0014350 A1 | 1/2003 | Duell et al. |
| 2004/0039748 A1* | 2/2004 | Jordan, II ............ G06F 17/3056 |
| 2005/0246269 A1* | 11/2005 | Smith ............................. 705/39 |
| 2006/0117247 A1 | 6/2006 | Fite et al. |
| 2006/0282381 A1 | 12/2006 | Ritchie |
| 2007/0011099 A1 | 1/2007 | Sheehan |
| 2007/0118530 A1* | 5/2007 | Chow et al. ..................... 707/10 |
| 2007/0203816 A1 | 8/2007 | Costache et al. |
| 2008/0027861 A1 | 1/2008 | Gendler |
| 2009/0150213 A1 | 6/2009 | Cyr et al. |
| 2012/0209635 A1 | 8/2012 | Young, III et al. |

OTHER PUBLICATIONS

"Curing Your Cash Positioning Ailments in the Sarbanes-Oxley Era" Applicants believe that the publication was published prior to the filed of this application.

International Search Report for Application No. PCT/US 11/62150, Jul. 27, 2012.

"Bank Gains Competitive Edge with a Unique XML-Based Desktop Liquidity Solution," Microsoft Corporation, Feb. 2006, Redmond, Washington.

Santiago, Milton, "Curing Your Cash Positioning Ailments in the Sarbanes-Oxley Era," LaSalle Bank, Chicago, Illinois, Applicants believe that the publication was published prior to the filed of this application.

Barth, Mary E., "Research, Standard Setting, and Global Financial Reporting," Now Publishers, Inc., vol. 1, No. 2, Apr. 5, 2007.

* cited by examiner

|   | A | B | C | I | J | K | L | M | N | O |
|---|---|---|---|---|---|---|---|---|---|---|
| 1 | CashPro Accelerate TM | | | | | | | | | |
| 2 | | | | | | | | | | |
| 3 | | | | 2/18/2008 | 2/19/2008 | 2/20/2008 | 2/21/2008 | 2/22/2008 | 2/23/2008 | 2/24 |
| 4 | | | | | | | | | | |
| 5 | | | | | | | | | | |
| 6 | | | | | | | | | | |
| 7 | | | | | | | | | | |
| 8 | | Outstanding Issues (OCI) | | 825,215.87 | 0.00 | 0.00 | 0.00 | 0.00 | 0.00 | |
| 9 | | | | | | | | | | |

Outstanding issue data can be mapped to any ad hoc report

Mappings

| Selected | Account | Account N |
|---|---|---|
| ☐ | XXXXXXX | |
| ☐ | XXXXXXX | |
| ☐ | XXXXXXX | |
| ☐ | XXXXXXX | |
| ☐ | XXXXXXX | |
| ☐ | XXXXXXX | |
| ☐ | XXXXXXX | |
| ☐ | XXXXXXX | |
| ☐ | XXXXXXX | |

[Exclude All] [Include All]

- Total Cash Center Debits (628)
- Total Debit Adjustments (630)
- Total Escrow Debits (640)
- Total Investment Debits (650)
- ...
- Outstanding Issues (OCI)
  - Credits
  - Debits
  - Formula

SYSTEMS AND METHODS FOR CASH POSITIONING AND REPORTING

CROSS-REFERENCE TO RELATED APPLICATION

This application claims priority from U.S. Provisional Application No. 61/074,713 filed on Jun. 23, 2008.

FIELD OF TECHNOLOGY

Aspects of the disclosure relate to cash positioning and reporting. Cash positioning typically refers to tracking daily cash positions for an entity. Such tracking may include determining the amount of cash on hand as well as the cash required for the continued functioning of an entity.

Cash forecasting may refer to determining the amount of cash on hand at a future date as well as the cash required for the continued functioning of an entity at a future date.

BACKGROUND

Currently, system users in need of cash positioning and reporting may be categorized in one of three general groups:

Data gatherers that obtain data from entity websites or other data sources and that key the obtained information into Microsoft Excel spreadsheets;

Data inputters that feed their data into an enterprise resource planning ("ERP") system for integration into their entity's general ledger ("GL") and production systems; and Data inputters that feed their data into one of many entity workstations dedicated to handling external databases, such as, e.g., a bank's dedicated entity workstations dedicated to handling treasury management activities.

It would be desirable to reduce the administrative overhead associated with cash positioning and reporting systems.

SUMMARY OF THE INVENTION

It is an object of the invention to reduce the administrative overhead associated with cash positioning and reporting systems.

A method according to the invention may include receiving a user selection to update a data store—i.e., receiving an indication from a user that he or she desires to update a store of data. The data store may include cash positioning and cash reporting information.

In response to the selection to update the data store, the method may further include calling a controller module. In response to calling the controller module, the method may include using the controller module to call a web service module.

In response to the call to the web service module, the method may include retrieving bank account information data. The bank account information data may be retrieved from various banking web sites. The method may also include populating a spreadsheet application with the retrieved bank account information. The spreadsheet application may be local to a client.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 8 shows a portion of a spreadsheet according to the invention;

FIG. 10 shows a screen shot that illustrates that a user can create granular reports according to the invention;

FIG. 11 shows a portion of a spread sheet that shows that currency rates can be automatically populated according to the invention;

FIG. 12 shows a dialogue box that allows a user to set default display currency for reports according to the invention;

DETAILED DESCRIPTION OF THE INVENTION

Figure 1:
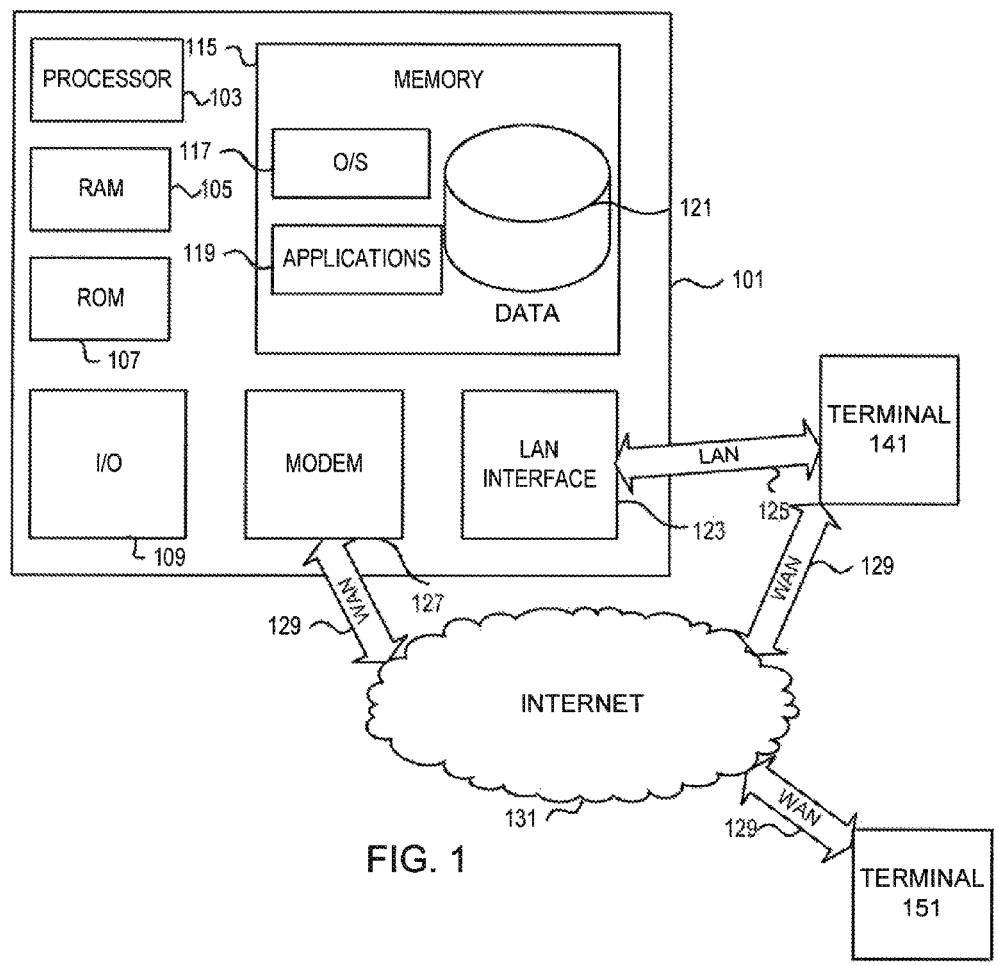
FIG. 1 illustrates a schematic diagram of a general-purpose digital computing environment in which one or more aspects of the present invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

A cash positioning and reporting tool according to the invention may be implemented using a Microsoft Excel spreadsheet application and Extensible Markup Language ("XML") technology.

A cash positioning and reporting tool according to the invention may gather data from bank websites or other data sources and populate that information into Microsoft Excel spreadsheets or other suitable spreadsheet applications. Such a system, according to the invention, can save time and improve accuracy over any manual method of data entry.

With respect to entering data into a workstation dedicated to an external—i.e., a system not local to the workstation—system, a system according to the invention may require minimal training compared to more complex systems. Its implementation time has averaged less than a month compared with 9-12 months for a standard dedicated workstation.

Some of the problems addressed by a system according to the invention may include:

Entities with bank accounts at different banks have to gather the data and consolidate it for cash reporting purposes. Multi-bank capabilities according to the invention offer the flexibility to access data from almost any financial service provider. This saves the time and effort of gathering that data from multiple sources.

Conventional Microsoft Excel® spreadsheets are not protected from alteration. However, data fields as used in systems according to the invention are preferably protected, preventing encrypted figures from being altered or misrepresented. This ensures data integrity and helps support Sarbanes-Oxley controls.

Often data pulled from bank websites is in a proprietary bank format and requires re-keying or other manipulation. A system according to the invention preferably gives the client sufficient flexibility to create custom-built spreadsheets to fit their respective reporting needs.

Since different users within a single entity may have different levels of data access, multiple data retrievals from bank systems are often required to get different data sets. Enhanced security features according to the invention allow for multiple user profiles which preferably define distinct information access.

Many banks keep limited amounts of transaction history for viewing. Systems according to the invention may store historical account data that can be imported and populated in the spreadsheets for a predetermined period of time and, once imported, the data is available until the client elects to delete it.

In conventional systems, if the person responsible for daily data gathering is unavailable, the data is missed for that day. Systems according to the invention, on the other hand, can download data either manually or automatically via the use of a Scheduler.

When investigating or auditing a transaction a client often has to refer back to bank systems to get detailed transaction information. A system according to the invention may store data locally in both summary and detail form for future analysis thus reducing redundant download fees.

Clients often spend time trying to figure out what transactions they missed in their prior day cash position. A special reconciliation feature according to the invention allows clients to compare forecasts from the day before with what actually posted that night.

Systems and methods according to the invention may include the following aspects.

One aspect of the invention preferably uses strong type-checking—i.e., a feature dedicated to catching erroneous modifications at compile time—and compile-time binding—i.e., a feature that chooses (binds) a method or methods to be executed in response to a request, based on the operation and objects in the request. If the information is known at compile time, the compiler verifies it is correct.

A component view according to the invention may be formed from three layers—a user interface ("UI") layer, a business layer, and a data layer. The UI Layer may bind attributes of business value objects to UI objects, present them to the user, accept inputs and process user "submit" requests by unbinding UI objects from business objects attributes. The business layer checks business rules and passes business objects to the data layer. The data layer preferably maps business attributes to persistent storage and encapsulates the data layer processing in a single, atomic transaction.

Advantages of the invention may include maximizing leverage of proven standards and technology, and the application of principles such as a single point of maintenance, configurability, extensibility and scalability.

The architecture of a software system may require the following views: a deployment view, a logical view, a data view and process view as shown in FIGS. 2, 3, 6, and 7. The portion of the specification corresponding to the FIGs. describes the views in more detail.

Each view preferably focuses on different aspects of the system. One purpose of the view structure set forth herein is to communicate the major components of the system, how each is structured, the process flows between the components, and the major interfaces between the components. From a high level, a goal of the views, as set forth herein, is to examine the system from several different perspectives, each providing a different "view" in order to capture system features.

A brief description of four architectural views according to the invention is provided as follows:

Deployment View—This view documents the physical topology of the system modeled in the Deployment Model. The deployment view as described below shows that each computer in the implementation may be coupled to a system according to the invention via the Internet.

Logical View—The logical view documents the Design Model, which defines the software layers of the application and the primary data classes within each layer. A system architect may be provided with the flexibility to identify patterns of functionality and create common mechanisms to provide this functionality to several areas across the application.

Data View—Classes of data in the logical view are classified as transient or persistent. The persistent classes are mapped to structures on disk, usually into a combination of rows in a relational database. An entity-relationship data model can be used to describe the database schema. This view also communicates how the classes are mapped to the relational tables.

Process (Concurrency) View—This view focuses on the concurrency aspects of the system and how the different aspects contend for shared resources. The process view documents the independent threads of execution within the system and describes how they communicate. It also preferably lists the resources in contention by these threads. The process view may also set forth a transaction model for maintaining integrity among these resources.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for the entire business, allowing interoperability between different elements of the business residing at different physical locations.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals, such as personal digital assistants ("PDAs") including various other components, such as a battery, speaker, and antennas (not shown).

Figure 2:
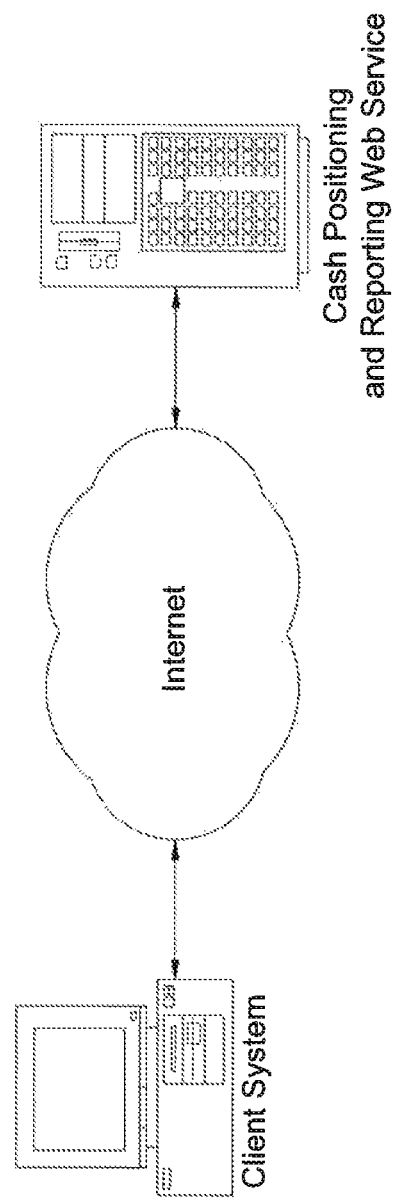
FIG. 2 illustrates a schematic diagram of another digital computing environment in which one or more aspects of the present invention may be implemented.

FIG. 2 shows a high level diagram that includes a client system 202, the Internet 204, and a web service 206. Such a system may preferably be used to implement that shows a data request ("get") made by the client system 202. That request may be made through web service 206 via the Internet 204. Web service 206 may validate the user credentials and return the requested data via Internet 204.

Figure 3:
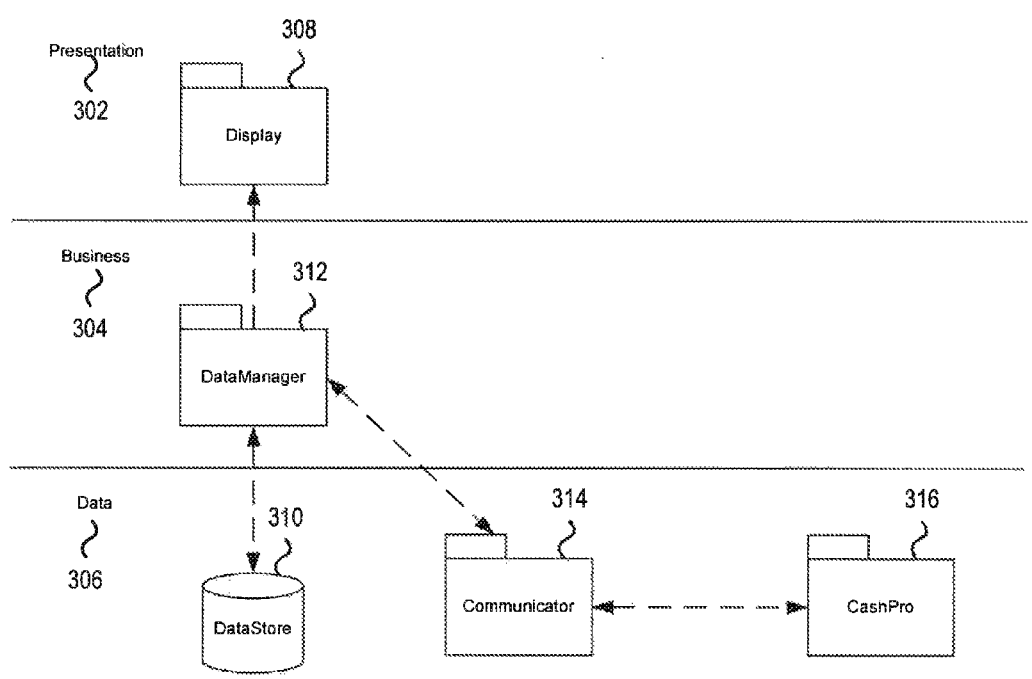
FIG. 3 shows a logical view that presents the core design of the system.

FIG. 3 shows a logical view that presents an exemplary design of a system according to the invention. In a broad sense, the invention may provide a "middleman" application that crawls the web and retrieves cash reporting and positioning information for an entity. Thereafter, the invention may populate a client-side spreadsheet application with the client information that has been retrieved from the web. The various efficiencies and flexibility that this affords a client are part of the invention as well.

The system may be formed from less than all the components shown in FIG. 3. FIG. 3, however, does present primary classes that collaborate to implement system functionality according to the invention. One embodiment of the invention may contain the following three software layers: presentation layer 302, business layer 304, and data layer 306.

While the three software layers of the application according to the invention, as set forth in FIG. 3, have been structured along three distinct layers—Presentation, Business, and Data; nevertheless, other layers and structures are also possible according to the invention.

Presentation layer 302 (alternatively referred to hererin as "UI layer"), may include a .Net component implemented in the C# language which is responsible for informing a spreadsheet resident at the client which values belong in which cells. The cells are displayed in display 308.

Business layer 304 insulates the UI Layer from the design of the datastore 310 in data layer 306. However, business layer 304 preferably does not maintain knowledge—i.e., store—of the presentation of data. This insulation provided business layer 304 allows the data to be retrieved from data layer 306 and populated into a client-side spreadsheet. Thus, the client is not required to take the data and code it into a spreadsheet. Business layer 304 may also be responsible for complex business rule logic, which may be implemented in datamanager 312, according to the invention.

Data layer 306 preferably manages persistent data and current transactions. Data layer 306 may also map data objects to physical storage. Data layer 306 may also be responsible for data integrity and transactions. Data layer 306 may preferably include a communicator 314 and CashPro application 316.

CashPro application 316 may retrieve the latest data from the web and store all the relevant data in the client computer via business layer 304. In some embodiments, the data can be maintained in an encrypted state in the client computer. Communicator 314 may be tasked with providing the latest data to data manager 312 (while datastore 310, on the other hand, may be tasked with providing historic data to data manager 312).

Figure 4:
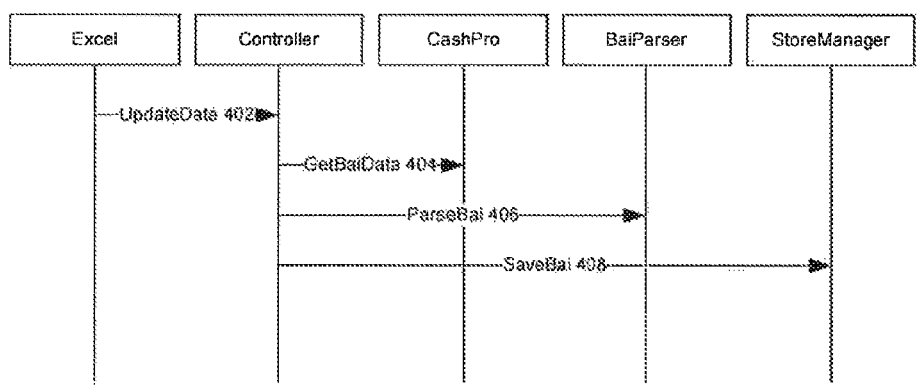
FIG. 4 shows a get data scenario according to the invention.

FIG. 4 shows a get data scenario according to the invention. A get data scenario according to the invention may include the following steps (the process steps have been illustrated in FIG. 4 and labeled with element numbers for clarity):

1. User clicks "Update" on toolbar according to the invention 402.
2. Excel calls (preferably via code behind class) into Controller.
3. Controller calls system according to the invention 404.
4. System calls web service and retrieves Bai2[1] data
5. Controller passes Bai2 data to BaiParser 406.
6. BaiParser translates Bai2 data into XML
7. Controller passes Bai2 XML to StoreManager 408.
8. StoreManager saves Bai2 XML to local file system.

[1]BAI2 (Bank Administration Institute, Cash Management Balance Reporting Specifications Version 2) data can be downloaded from the web service according to the invention and parsed into an XML format. There can be multiple BAI2 data files (1 per day) and they can follow the naming pattern XXXXXXXX.bai where XXXXXXXX is the date of the file (i.e. 04112005).

Figure 5:
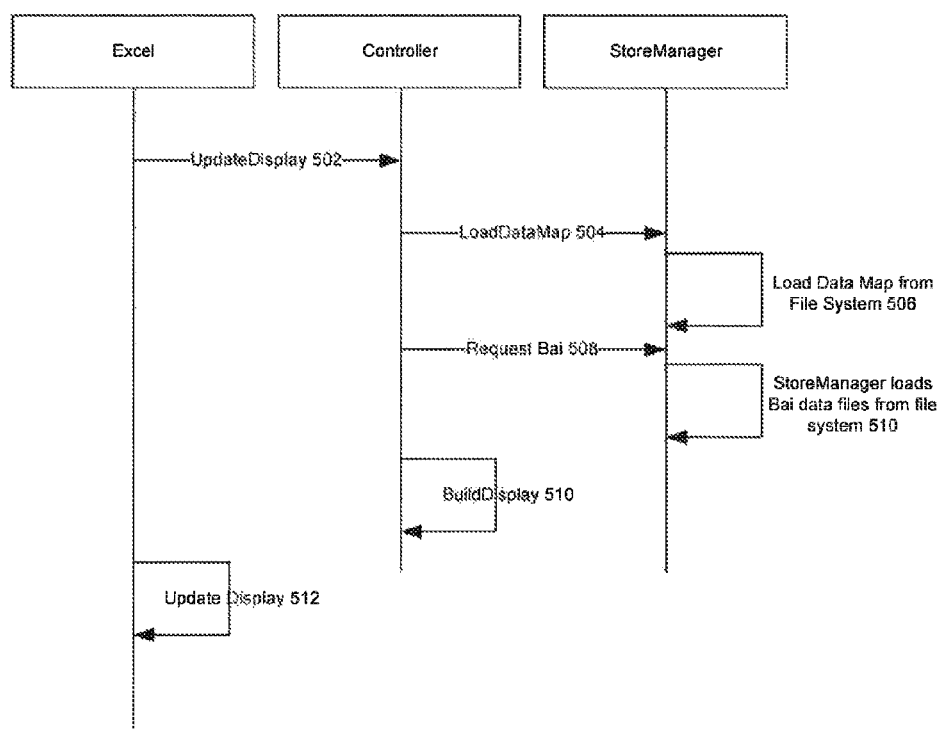
FIG. 5 shows an update display scenario according to the invention.

FIG. 5 shows an update display scenario according to the invention. An update display scenario according to the invention may include the following steps, following a user selection of an update:

1. Excel calls (via code behind class) into Controller 502.
2. Controller requests data map from StoreManager 504.
3. StoreManager loads data map from file system 506.
4. Controller requests Bai2 data files from StoreManager 508.
5. StoreManager loads Bai2 data files from file system 510.
6. Controller evaluates data map against Bai2 data 512 and constructs a Display instance 512.

Figure 6:
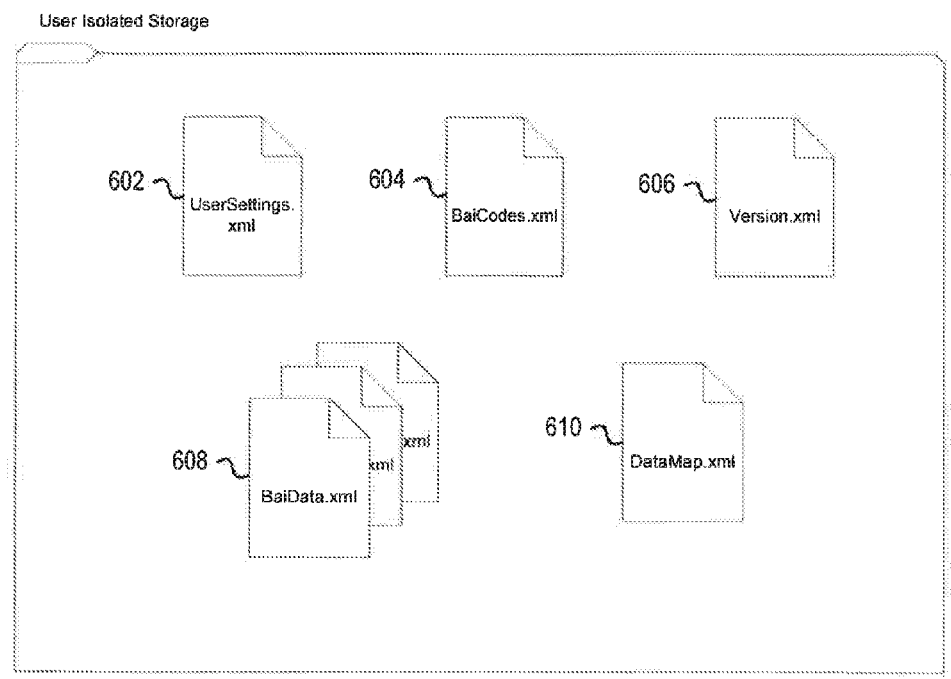
FIG. 6 shows a data view of the invention.

FIG. 6 shows a data view of the invention. The local file system—i.e., user isolated storage—can act as the persistent data store for a cash reporting and positioning system according to the invention. The following exemplary list details each of the exemplary files and their contents:

UserSettings.xml 602—all user customizable settings.

BaiCodes.xml 604—all Bai data codes and their associated data labels.

Version.xml 606—version numbers of all currently installed components, which can be used for update checks, as set forth above in step 508 in FIG. 5.

BaiData.xml 608—Bai2 data downloaded from the Cash-Pro web service and parsed into an XML format. There can be multiple Bai2 data files (1 per day) and they can follow the naming pattern XXXXXXXX.bai where XXXXXXXX represents the date of the file (i.e. 04112005).

DataMap.xml 610—Mapping information indicating which fields in the Excel spreadsheet map to specific Bai2 data items.

A more detailed list of exemplary files is set forth in the Appendix.

Figure 7:
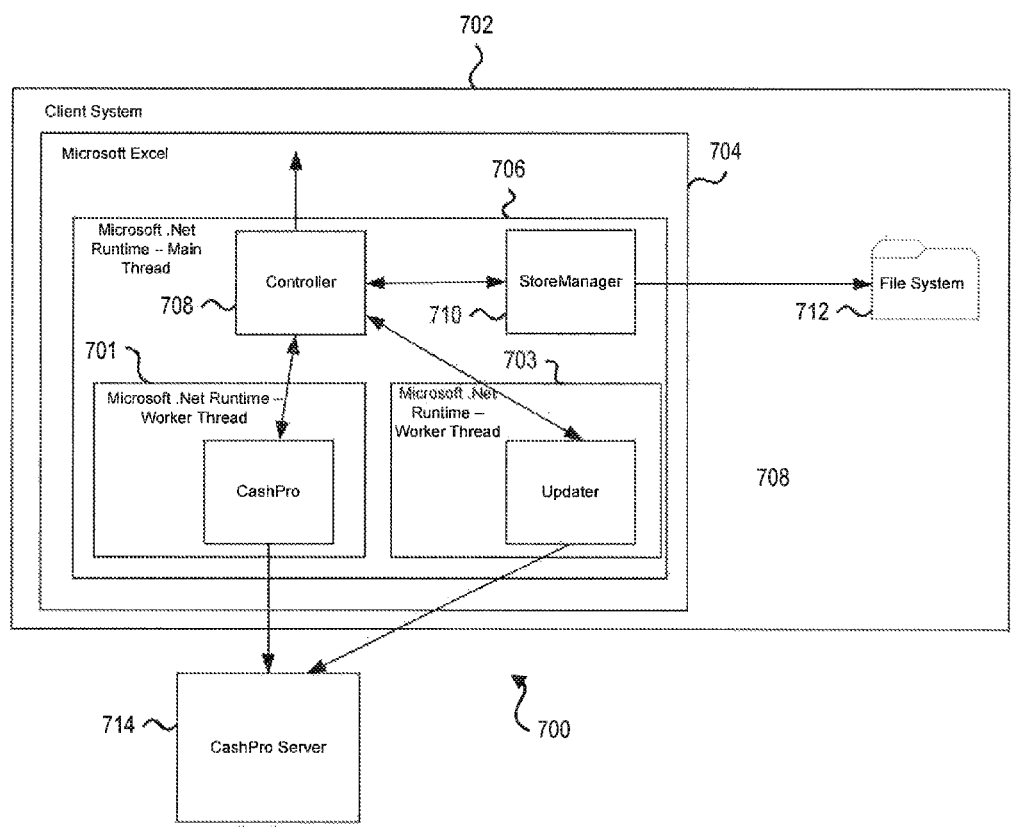
FIG. 7 shows a process view according to the invention.

FIG. 7 shows a process view according to the invention. Process 700 may be implemented on client system 702, which may be running spreadsheet 704.

Main thread 706 may preferably utilize controller 708 and storemanager 710 to communicate with file system 712. Process 700 may also utilize a separate worker thread (such as CashPro thread 701 and updater thread 703) for interactions with the CashPro server 714 (including downloading of data and application updates). This can allow the UI to remain responsive while the positioning and reporting data is being downloaded.

FIG. 8 shows a portion 802 of a spreadsheet that indicates that outstanding issue information can be mapped over time. Such mapping preferably allows the understanding of trends with respect to the outstanding issue information. Such outstanding issues may relate to problematic accounts or problematic entries. Furthermore, FIG. 8 shows that outstanding issues can be mapped in an ad hoc report. 804. While this feature has been described in terms of outstanding issue mapping, nevertheless the feature of mapping over time can be used to analyze any suitable trend of information that is resident in the application according to the invention.

Figure 9:
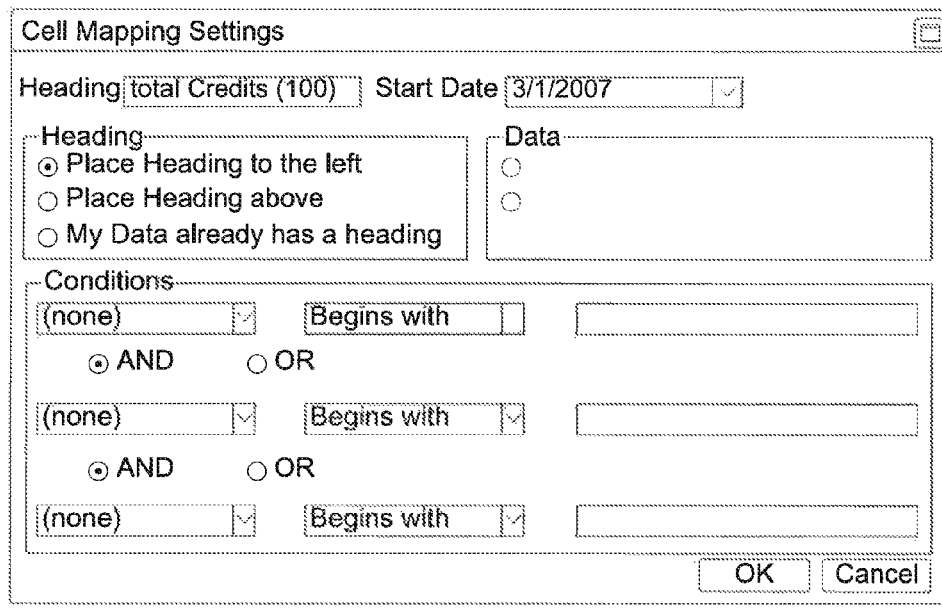
FIG. 9 shows a screen shot that illustrates the creating of detailed transaction spreadsheets according to the invention.

FIG. 9 shows a screen shot 900 that illustrates a dialogue box which may be used for creating of detailed sheets of transaction by the transaction remitter. Such sheets may include high dollar transaction reports as well as negative balance alert reports. Such detailed sheets implement filtering conditions 902 and/or date restrictions 904 which may be used to specify transaction sheets.

Figure 10:
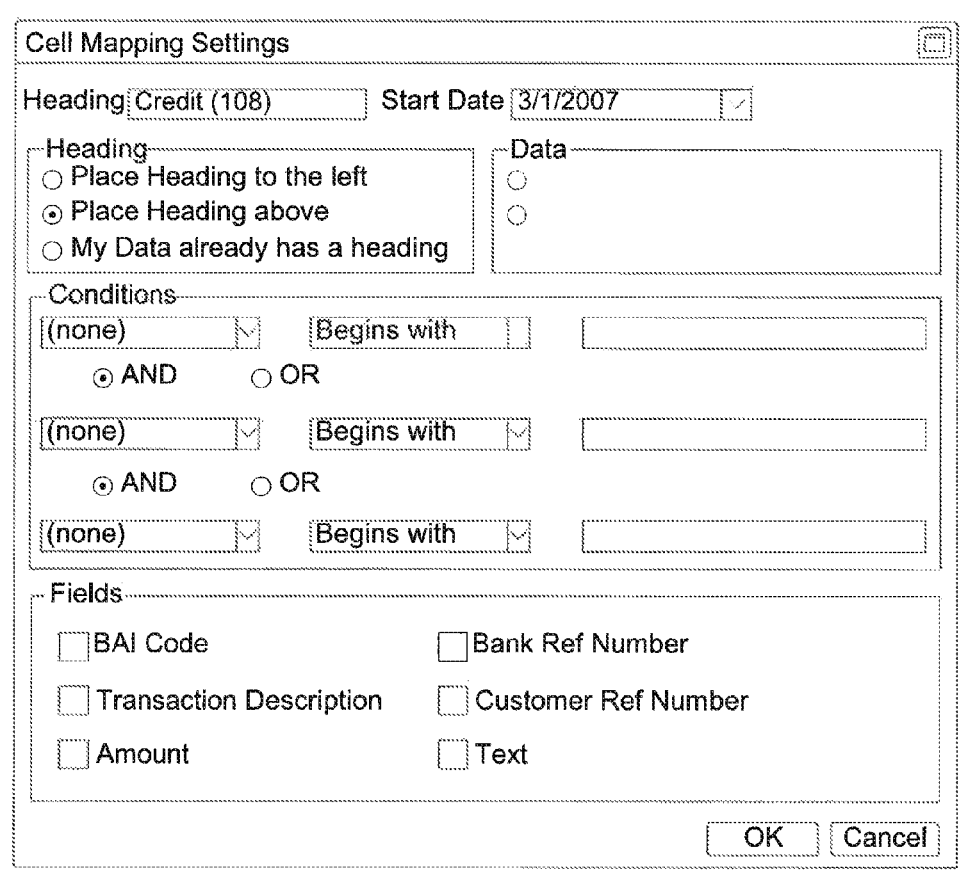

FIG. 10 shows a screen shot 1000 that illustrates that a user can create granular reports based on information in their BAI2 files. Section 1002 indicates that such reports may be filtered to allow the splitting of transaction types based on internal divisions. Furthermore, lockbox deposits may be split by lockbox number and ACH transactions may be split according to the sender of the ACH.

Figures 11, 12:
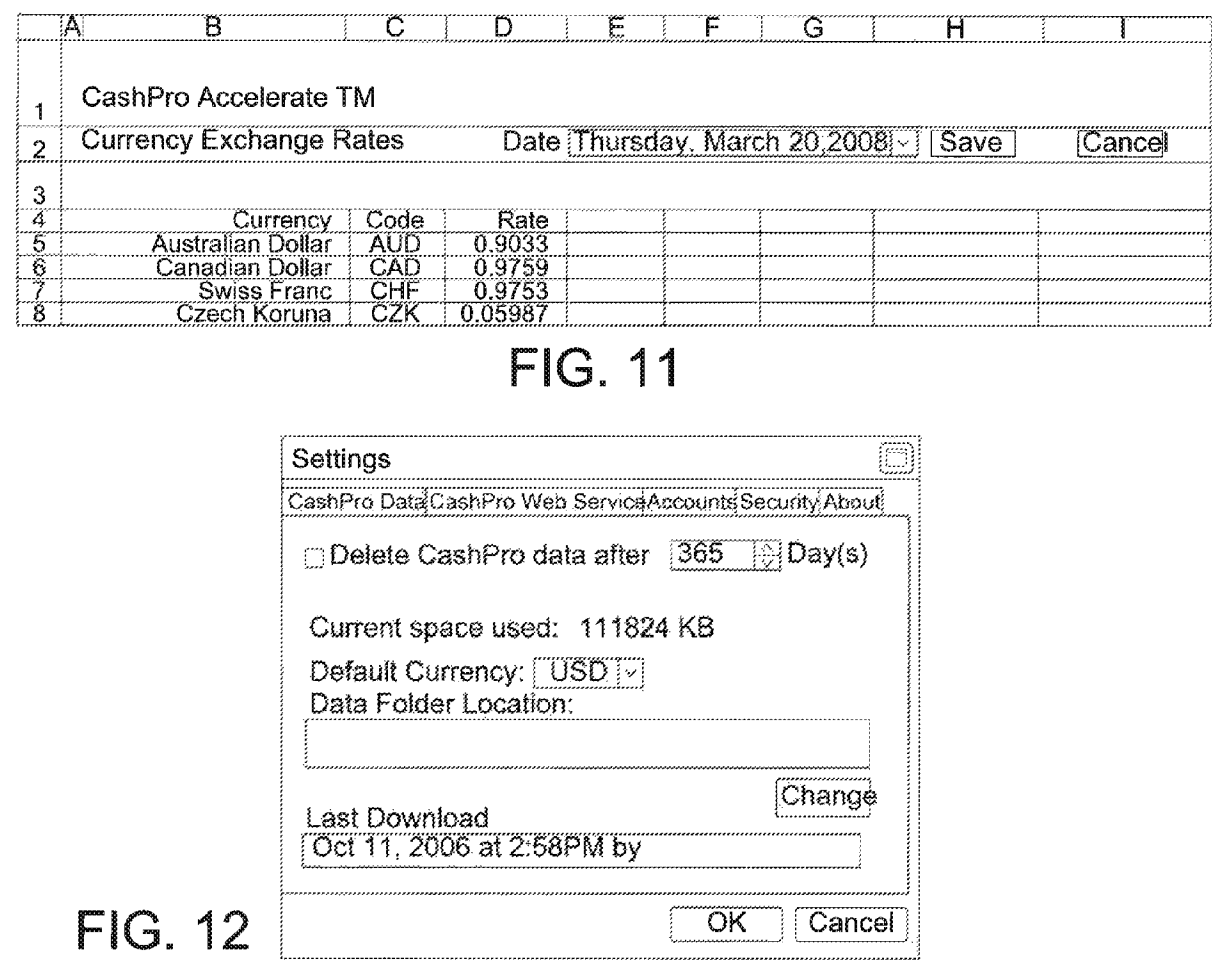

FIG. 11 shows a portion 1102 of a spread sheet that shows that currency rates can be automatically populated, or can be changed manually.

FIG. 12 shows a dialogue box 1202 that allows a user to set default display currency for reports. Furthermore, in certain aspects of the invention, fixed sheets may auto convert data based on currency rates that are downloaded daily or at some other preferably predetermined interval.

Figure 13:
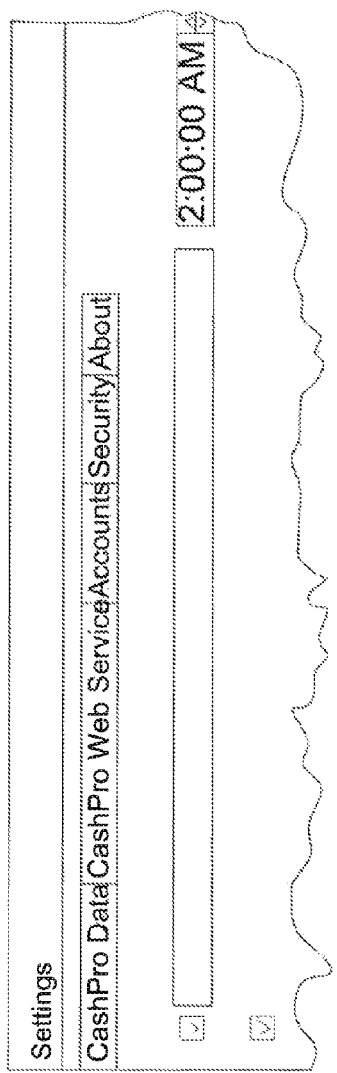
FIG. 13 shows a portion of a spread sheet that indicates that the user is not required to open Excel® for the operation of systems and methods according to the invention.

FIG. 13 shows a portion of a spread sheet that indicates that the user is not required to open Excel® for the operation of systems and methods according to the invention—nor is the user required to be logged ON to the PC. In fact, the only requirement may be to have the PC ON and connected to the appropriate network in order to download the appropriate information.

Figure 14:
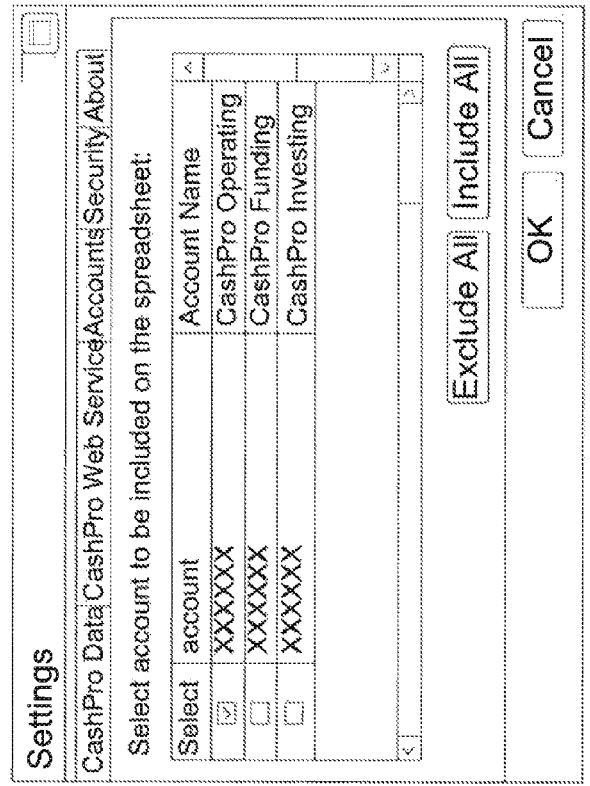
FIG. 14 shows a dialogue box that allows a user to specify accounts for which the user desires to obtain a report.

FIG. 14 shows a dialogue box 1402 that allows a user to identify the accounts for which the user desires to obtain a report. Such a dialogue box may also allow a user to sort by account number and account name.

Figure 15:
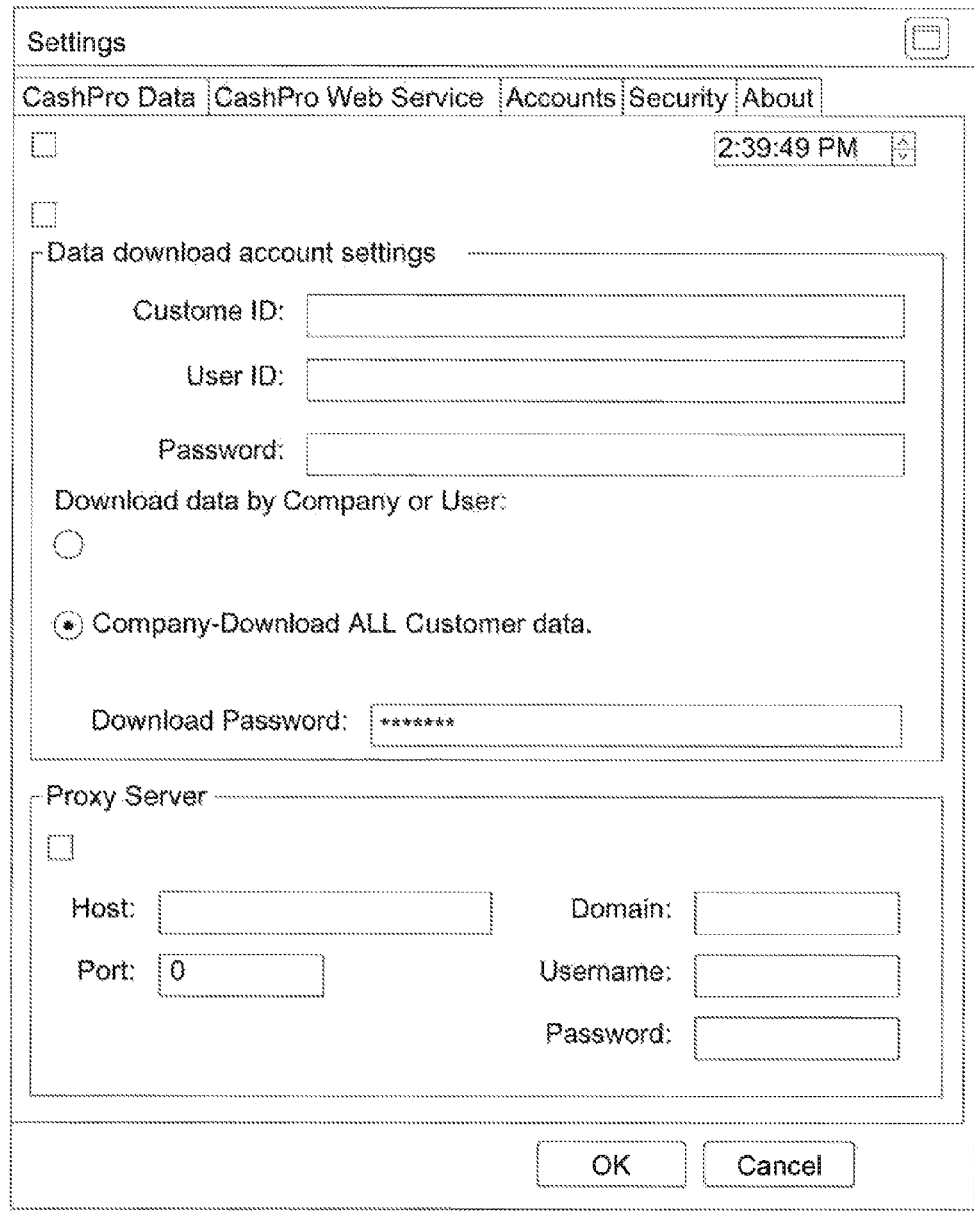
FIG. 15 shows a dialogue box that allows a user to restrict access to selected accounts and set different passwords to access data and download data according to the invention.

FIG. 15 shows a dialogue box 1502 that allows a user to restrict access to selected accounts and set different passwords to access data and download data. In such an embodiment of the invention, data can be stored on a network and can be securely shared between many disparately-authorized users.

The following is a list of some of the features of some embodiments of the invention described and shown herein. These features may include the ability to retrieve BAI2 data for multiple banks and then populate an Excel® Spreadsheet, or other suitable spreadsheet, automatically. Such a feature preferably removes the burden of re-keying data and substantially eliminates keying errors.

Another feature may include the ability to create self-designed ad hoc reports and have these reports automatically updated with data from multiple banks. Such a feature may allow a user to use his/her current format and design a sheet that he/she is familiar with, but still retains the benefit of auto population.

Yet another feature may include providing an ability to click on a summary data item and see the detail associated with the item. Such a feature may allow a user to view detail data without having to go back to the website.

Yet a further feature of the invention is an ability to reconcile the prior day's forecast with the up-to-date data. Such a feature may allow a user to understand daily difference in cash flows.

The invention may also provide the ability to create GL files based on downloaded BAI2 data. Accordingly, GL files do not need to be created manually. The data can be automatically mapped based on user-defined (or system-defined) rules that can be maintained in the spreadsheet.

Additionally, systems and methods may present the ability to select which accounts to use from the user available accounts in order to calculate the data to be shown on the spreadsheets. Such a feature may allow the user to get the cash position on one or many accounts without having to re-retrieve that data from an associated bank.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing a cash positioning and reporting tool according to the invention have been provided. Persons skilled in the art will appreciate that the present invention can be practiced by other than the described embodiments, which are presented for purposes of illustration rather than of limitation, and the present invention is limited only by the claims which follow.

APPENDIX A

SOFTWARE ARCHITECTURE DOCUMENT

Table of Contents

| | |
|---|---|
| Introduction | 25 |
| Architecture Guidelines | 26 |
| Deployment View | 26 |
|     CLIENT SYSTEM | 27 |
| Logical View | 27 |
|     THREE SOFTWARE LAYERS | 28 |
|     LOGICAL ENTITIES | 29 |
|     SCENARIOS | 30 |
|         Get Data Scenario | 30 |
|         Update Display Scenario | 31 |
|         Update Cell Mapping Scenario | 32 |
| Data View | 33 |
|     PHYSICAL MODEL | 33 |
|     DATA DICTIONARY | 35 |
|         User Settings XML Sample | 35 |
|         Data Map XML Sample | 35 |
|         Bai Data XML Sample | 36 |
|         Bai Codes XML Sample | 36 |
|         Versions File XML Sample | 36 |
|         Currency Codes Sample | 37 |
| Process View (Concurrency) | 37 |
|     CPU/PROCESS/THREAD DESIGN | 37 |
| Implementation View | 38 |
|     CASHPRO WEB SERVICES | 39 |

Security View ............................................................................................................................... 40
    USER IDENTIFICATION & AUTHENTICATION ........................................................................... 40
    AUTHORIZATION ................................................................................................................ 40
    DATA ENTITLEMENT ........................................................................................................... 40
    DATA INTEGRITY AND PRIVACY ............................................................................................ 40
    NON-REPUDIATION & AUDITING .......................................................................................... 40

INTRODUCTION

The Software Architecture Document captures all of the internal – "in between the walls" – decisions required to implement the system.

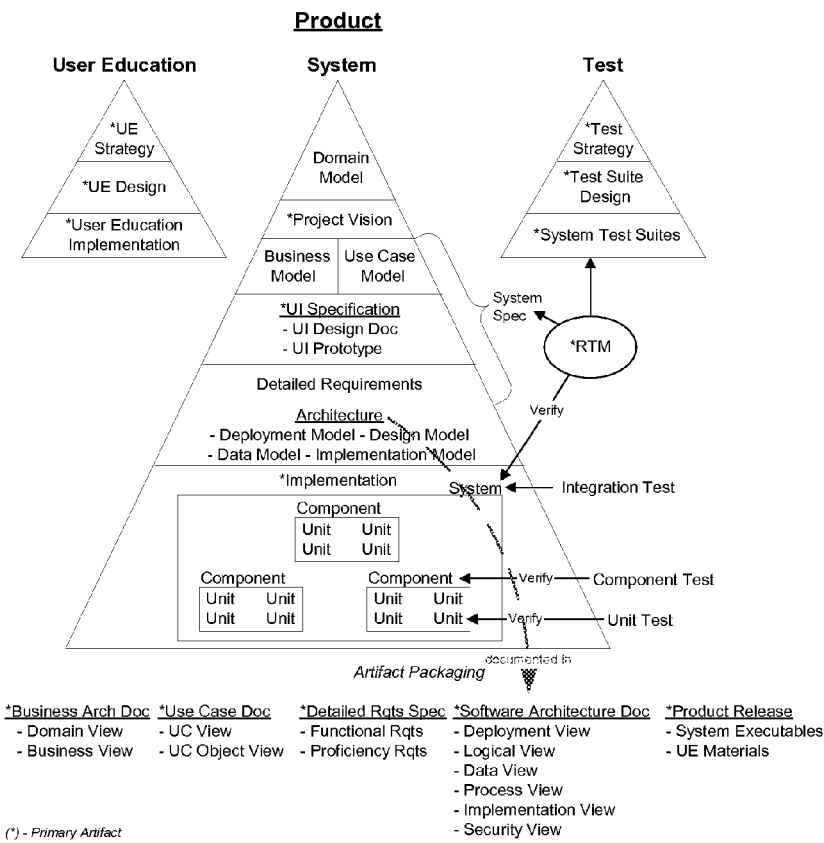

The architecture of a software system may require six distinct views, each view focusing on different aspects of the system. One purpose is to communicate the major components of the system, how it is structured, the system process flows, and major interfaces. From a high level, the goal is to examine the system from several different perspectives, each providing a different "view" in order to capture all critical system features. A brief description of the six architecture views is provided as follows:

Deployment View – This view documents the physical topology of the system modeled in the Deployment Model. It includes each computer in the implementation and describes how they are interconnected. The configuration for each node is also specified – O/S, DB, COTS and custom applications.

Logical View – The logical view documents the Design Model, which defines the layers of the application and the primary classes within each layer. The system architect identifies patterns of functionality and creates common mechanisms to provide this functionality to several areas across the application.

Data View – Classes in the logical view are classified as transient or persistent. The persistent classes are mapped to structures on disk, usually into a combination of rows in a relational database. An entity-relationship data model describes the database schema. This view also communicates how the OO classes are mapped to the relational tables.

Process (Concurrency) View – This view focuses on the concurrency aspects of the system and how they contend for shared resources (i.e., transaction semantics, etc.). The process view documents the independent threads of execution within the system and describes how they communicate. It also lists the resources in contention by these threads and the transaction model for maintaining integrity with these resources.

Implementation View – This view maps the classes in the Logical View to physical source files and combines the files into deployable components. The implementation view also tracks the dependencies among the components.

Security View – This view focuses on how the system identifies end users, grants authorization to them based on their identity, ensuring integrity of the system and of the data and properly tracking and auditing of system activity.

ARCHITECTURE GUIDELINES

The system follows the following design guidelines:

- Object-oriented design principles. Business objects discovered during analysis form the basis of the business services API. Attributes and behavior are encapsulated within business and value classes.

- Leverage strong type checking and compile-time binding. If the information is known at compile time, the compiler verifies it is correct.

- The component view is formed along three layers – UI Layer, Business Layer, and Data Layer. The UI Layer binds attributes of business value objects to UI objects, presents them to the user, accepts input and processes "submit" requests by unbinding from UI objects to business objects attributes. The business layer checks business rules and passes business objects to the data layer. The data layer maps business attributes to persistent storage and encapsulates its processing in a single, atomic transaction.

- Maximize leverage of proven standards and technology

- Design for the long term applying principles such as,
  - Single point of maintenance
  - Configurable, extensible
  - Scalable

DEPLOYMENT VIEW

The deployment view presents the topology and its physical and logical connections, followed by the detailed configuration for each node in the network.

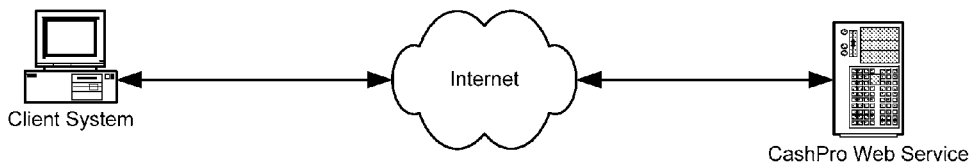

CLIENT SYSTEM

| Software | Comments |
|---|---|
| Windows 2000, 2003, XP, or Vista | |
| Microsoft Office 2003 or 2007 Professional | SP1, must include Primary Interop Assemblies |
| Microsoft .Net™ Framework 2.0 | SP1 |
| VSTO Redistributable | 2.0 |

The following registry entries are added to the client system to track the location of Accelerate and its related files:

- HKEY_LOCAL_MACHINE\SOFTWARE\CashPro\Accelerate\File Locations\applicationPath
- HKEY_LOCAL_MACHINE\SOFTWARE\CashPro\Accelerate\File Locations\dataPath In addition, a .NET security policy is created giving full trust to the custom application assemblies. This is necessary to allow Excel to load the custom application assemblies at runtime.

LOGICAL VIEW

The logical view presents the core design of the system. It presents the primary classes that collaborate to implement the system functionality. It contains the following subsections:

- Three Software Layers
- Logical Entities
- Scenarios

THREE SOFTWARE LAYERS

The application is structured along three distinct layers – Presentation, Business, and Data.

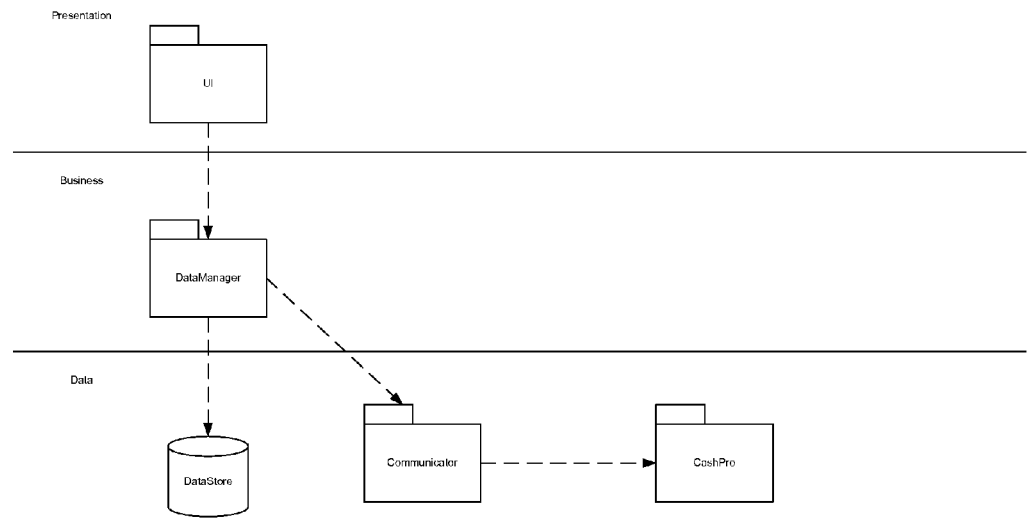

Presentation Layer: .Net component implemented in C# which is responsible for informing Excel which values belong in which cells.

Business Layer: Maintains no knowledge of presentation. Insulates the UI Layer from DataStore design. Responsible for complex business rule logic.

Data Layer: Responsible for managing persistent data and transactions. Maps business objects to physical storage. Responsible for data integrity and transactions.

LOGICAL ENTITIES
The following diagram depicts the logical entities that exist on the custom application system
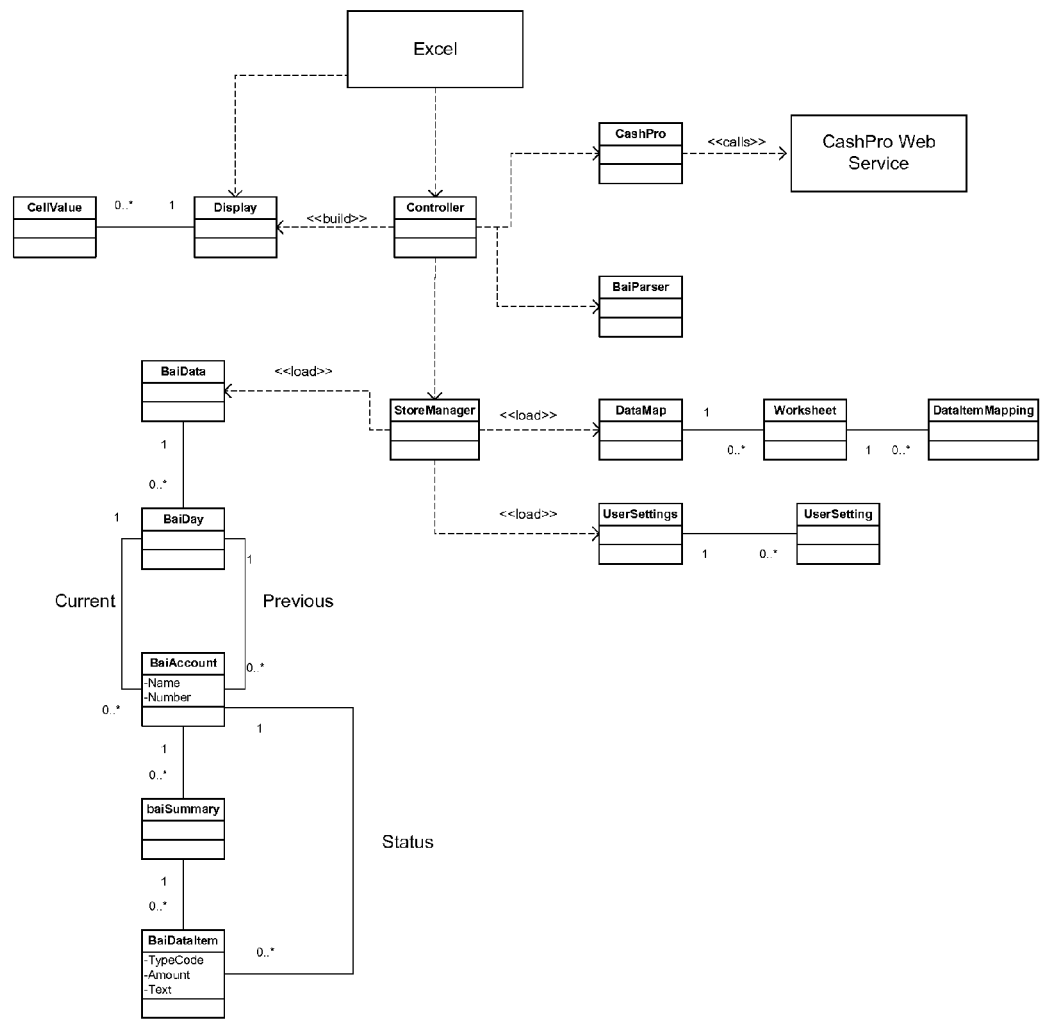

SCENARIOS

The logical flow of CashPro Accelerate is described through a series of scenarios.

GET DATA SCENARIO

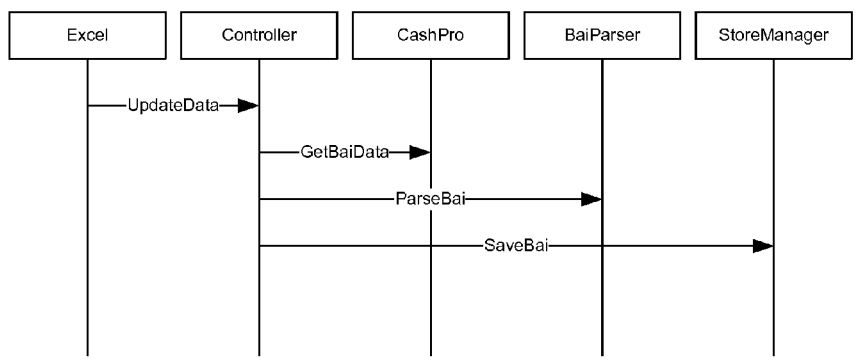

1. User clicks "Update" on CashPro toolbar
2. Excel (via code behind class) calls into Controller
3. Controller calls CashPro
4. CashPro call CashPro web service and retrieves Bai data
5. Controller passes Bai data to BaiParser
6. BaiParser translates Bai data into Xml
7. Controler passes Bai Xml to StoreManager
8. StoreManager saves Bai Xml to local file system

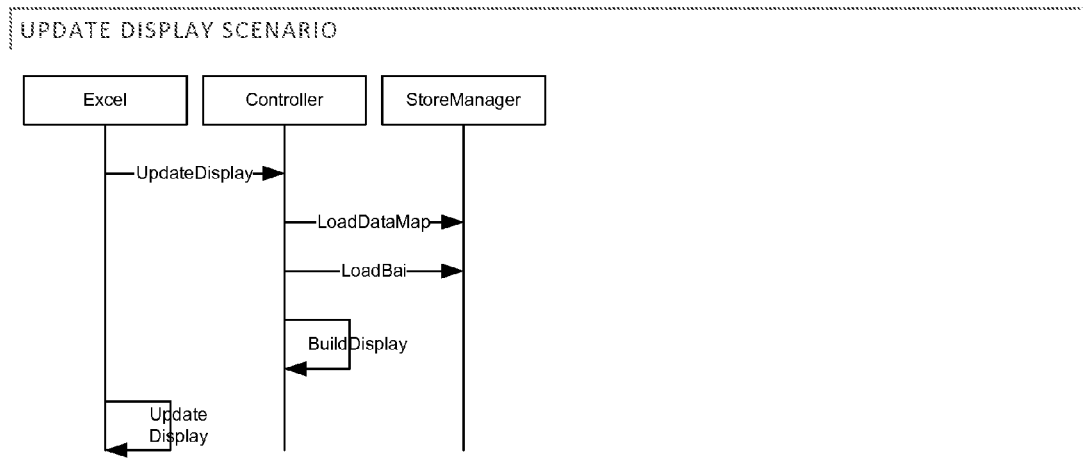

1. User clicks "Update" on CashPro toolbar
2. Excel (via code behind class) calls into Controller
3. Controller requests data map from StoreManager
4. StoreManager loads data map from file system
5. Controller requests Bai data files from StoreManager
6. StoreManager loads Bai data files from file system
7. Controller evaluates data map against Bai data and constructs a Display instance
8. Excel examines each CellValue in the Display instance and set the indicated cell to the indicated value UPDATE CELL MAPPING SCENARIO
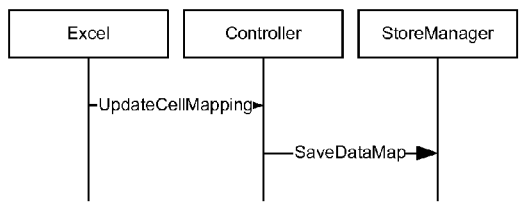
1. User maps a cell in Excel
2. Excel (via code behind class) calls into the Controller class
3. Controller updates the internal data map
4. Controller submits data map to the StoreManager for saving
5. StoreManager saves the data map to the local file system

DATA VIEW

PHYSICAL MODEL

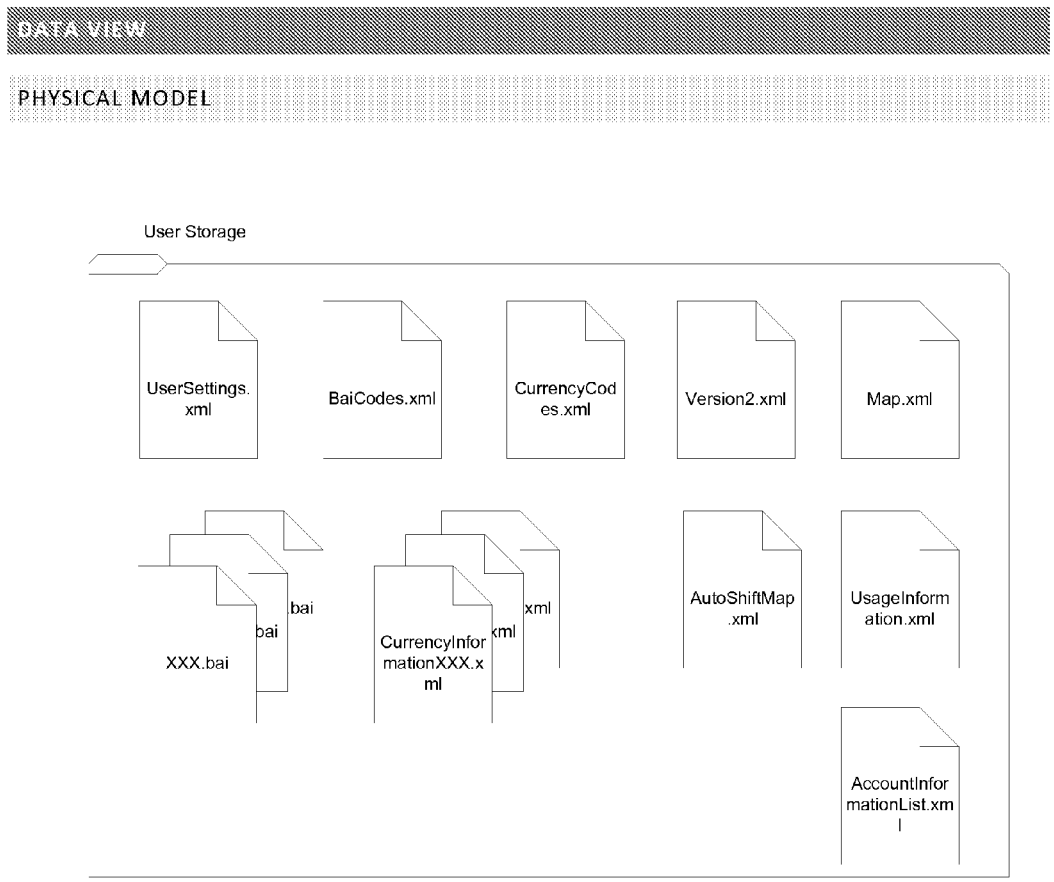

The local file system will act as the persistent data store for CashPro Accelerate. The following list details each of the file and their contents:

| File | Description |
|---|---|
| *.bai | Bai data downloaded from the CashPro web service and parsed into an Xml format. There will be multiple Bai data files (1 per day) and they will follow the naming pattern XXXXXXXX.bai where XXX is the date of the file (i.e. 04112005). |
| AccountInformationList.xml | Account numbers and names assigned to the user. |
| AutoShiftMap.xml | Map shifting information for Ad-Hoc sheets |
| BaiCodes.xml | All Bai data codes and their associated data labels. |
| CurrencyCodes.xml | Currency names and formatting information |
| CurrencyInformationList*.xml | Currency exchange rate data. There will be multiple files (1 per day) and |

| File | Description |
|---|---|
| | they will follow the naming pattern CurrencyInformationListXXXXXXXX.xml where XXX is the date of the file (i.e. 20080128). |
| Map.xml | Mapping information indicating which fields in the Excel spreadsheet map to specific Bai data items. |
| UsageInformationList.xml | Tracks user actions for communication to bank servers |
| UserSettings.xml | All user customizable settings. |
| Version.xml | Version numbers of all currently installed components. Used for update checks. |

DATA DICTIONARY

USER SETTINGS XML SAMPLE

```xml
<UserSettings xmlns:xsi="http://www.w3.org/2001/XMLSchema-instance" xmlns:xsd="http://www.w3.org/2001/XMLSchema">
 <Accounts />
 <Settings>
  <UserSetting>
   <Name>CurrencyCode</Name>
   <Value>None</Value>
  </UserSetting>
  <UserSetting>
   <Name>CustomerID</Name>
   <Value />
  </UserSetting>
  <UserSetting>
   <Name>DownloadType</Name>
   <Value>user</Value>
  </UserSetting>
  <UserSetting>
   <Name>Password</Name>
   <Value />
  </UserSetting>
  <UserSetting>
   <Name>WorkSheetHasPassword</Name>
   <Value>False</Value>
  </UserSetting>
  <UserSetting>
   <Name>UserID</Name>
   <Value />
  </UserSetting>
 </Settings>
</UserSettings>
```

DATA MAP XML SAMPLE

```xml
<DataMap xmlns:xsi="http://www.w3.org/2001/XMLSchema-instance" xmlns:xsd="http://www.w3.org/2001/XMLSchema">
 <WorkSheetMaps>
  <WorkSheetMap IsCustomTemplate="false" IsTemplateBased="false" Name="Test 1" AdHocWorksheetType="Vertical">
   <Mappings>
    <DataItemMapping Cell="E4" DataDate="0001-01-01T00:00:00" AsOfDate="0001-01-01T00:00:00" DataType="SameDay">
     <Text>Opening Ledger (010)</Text>
     <TypeCodes />
     <Fields>
      <Fields>Heading</Fields>
     </Fields>
    </DataItemMapping>
    <DataItemMapping Cell="D4" DataDate="0001-01-01T00:00:00" AsOfDate="0001-01-01T00:00:00" DataType="SameDay">
     <Text>Opening Ledger (010)</Text>
     <TypeCodes />
     <Fields>
      <Fields>Heading</Fields>
     </Fields>
    </DataItemMapping>
    <DataItemMapping Cell="D5" DataDate="2008-01-31T00:00:00" AsOfDate="2008-01-30T00:00:00" DataType="PreviousDay">
     <Text xsi:nil="true" />
     <TypeCodes>
      <TypeCode>010</TypeCode>
```

```
      </TypeCodes>
      <Accounts>
        <Account>100005018</Account>
      </Accounts>
      <FieldConditions />
     </DataItemMapping>
   </Mappings>
  </WorkSheetMap>
 </WorkSheetMaps>
 <SheetType />
</DataMap>
```

BAI DATA XML SAMPLE

```
<BaiDay xmlns:xsi="http://www.w3.org/2001/XMLSchema-instance" xmlns:xsd="http://www.w3.org/2001/XMLSchema" Date="2007-11-15T00:00:00" PreviousDayAsOfDate="2007-11-14T00:00:00" SameDayAsOfDate="2007-11-15T00:00:00" IsImported="false">
  <SameDayData>
    <BaiAccount AccountNumber="5598880010" AccountName="" CurrencyCode="USD" OriginatorID="071000505">
      <BaiSummaries>
        <BaiSummary>
          <BaiDataItem TypeCode="100" Level="Summary" Description="Total Credits" Amount="234700.469999999997" BankRefNumber="" CustomerRefNumber="" ValueDate="0001-01-01T00:00:00" Text="" GLStatus="None">
            <Availability />
          </BaiDataItem>
          <Details />
        </BaiSummary>
      </BaiSummaries>
    </BaiAccount>
  </SameDayData>
</BaiDay>
```

BAI CODES XML SAMPLE

```
<BaiCodes xmlns:xsd="http://www.w3.org/2001/XMLSchema" xmlns:xsi="http://www.w3.org/2001/XMLSchema-instance" xmlns="http://www.cashpro.com/cashpro/excel">
  <Codes>
    <BaiCode Level="DetailCredit" TypeCode="108" Description="Credit" ParentCode="390" />
    <BaiCode Level="DetailCredit" TypeCode="115" Description="Lockbox Deposit" ParentCode="110" />
    <BaiCode Level="DetailCredit" TypeCode="118" Description="Lockbox Adjustment Credit" ParentCode="390" />
    <BaiCode Level="DetailCredit" TypeCode="121" Description="EDI Transaction Credit" ParentCode="120" />
    <BaiCode Level="DetailCredit" TypeCode="142" Description="ACH Credit" ParentCode="140" />
    <BaiCode Level="DetailCredit" TypeCode="145" Description="ACH Concentration Credit" ParentCode="140" />
  </Codes>
</BaiCodes>
```

VERSIONS FILE XML SAMPLE

```
<ArrayOfFileVersion xmlns:xsd="http://www.w3.org/2001/XMLSchema" xmlns:xsi="http://www.w3.org/2001/XMLSchema-instance">
<FileVersion>
  <IsCustomTemplate>false</IsCustomTemplate>
  <FileName>BAICodes.xml</FileName>
  <FileUrl>http://chat.cashproweb.com/cpuniversity/products/reporting/Reporting_CashProAccelerate.asp</FileUrl>
  <Location>https://www.cashproweb.com/cpwportal/ContentMgmtService/resources/Review/cpwexcel/xml</Location>
  <Description>Updated BAI Codes File</Description>
  <SheetType />
  <CurrentVersion>8</CurrentVersion>
  <SkippedVersion>0</SkippedVersion>
</FileVersion>
```

`</ArrayOfFileVersion>`

CURRENCY CODES SAMPLE

```xml
<CurrencyCodes xmlns:xsd="http://www.w3.org/2001/XMLSchema" xmlns:xsi="http://www.w3.org/2001/XMLSchema-instance"
xmlns="http://www.cashpro.com/cashpro/excel">
  <Codes>
    <CurrencyCode Code="XOF" DecimalPlaces="0" />
    <CurrencyCode Code="XAF" DecimalPlaces="0" />
    <CurrencyCode Code="KMF" DecimalPlaces="0" />
    <CurrencyCode Code="XPF" DecimalPlaces="0" />
    <CurrencyCode Code="JPY" DecimalPlaces="0" />
    <CurrencyCode Code="MRO" DecimalPlaces="1" />
    <CurrencyCode Code="BHD" DecimalPlaces="3" />
    <CurrencyCode Code="EGP" DecimalPlaces="3" />
    <CurrencyCode Code="IQD" DecimalPlaces="3" />
    <CurrencyCode Code="JOD" DecimalPlaces="3" />
    <CurrencyCode Code="KWD" DecimalPlaces="3" />
    <CurrencyCode Code="LYD" DecimalPlaces="3" />
    <CurrencyCode Code="MTL" DecimalPlaces="3" />
    <CurrencyCode Code="OMR" DecimalPlaces="3" />
    <CurrencyCode Code="SDP" DecimalPlaces="3" />
    <CurrencyCode Code="TND" DecimalPlaces="3" />
    <CurrencyCode Code="YDD" DecimalPlaces="3" />
  </Codes>
</CurrencyCodes>
```

PROCESS VIEW (CONCURRENCY)

CPU/PROCESS/THREAD DESIGN

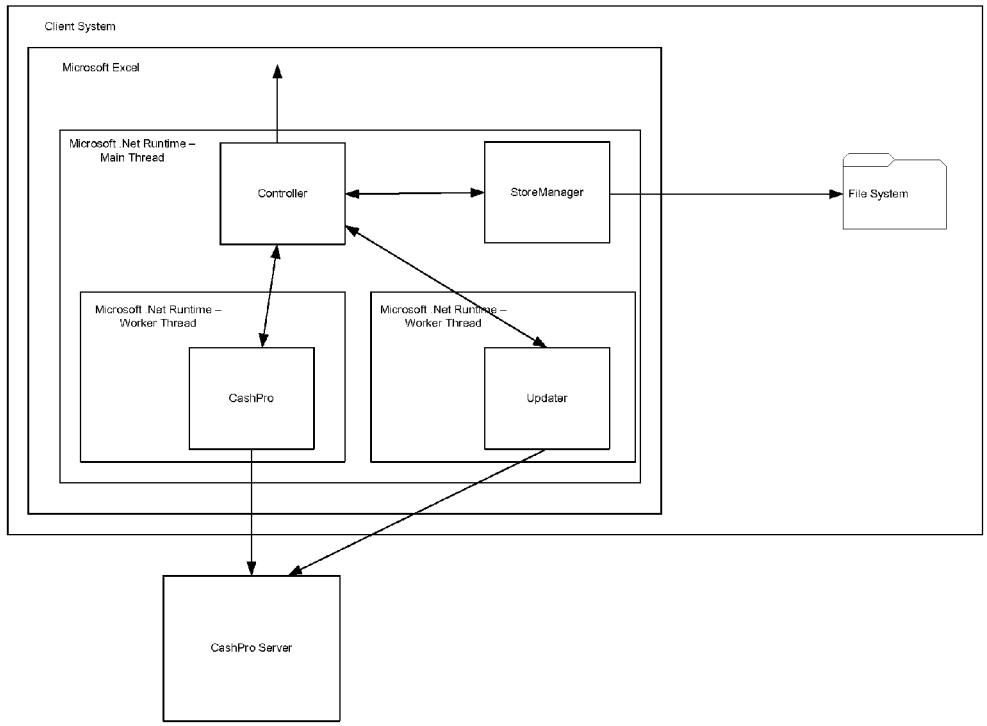

CashPro Accelerate will utilize a separate worker thread for all interactions with the CashPro server (including downloading of CashPro data and application updates). This will allow the UI to remain responsive while CashPro data is being downloaded.

IMPLEMENTATION VIEW

The implementation view describes how the classes and logic in the Design Model are physically implemented with source code. It also describes how the implementation source is physically contained in files and how these files combine to form executable components.

The Implementation Model combines source units into packages to form components, such as a .jar, .ear, war, .dll or a .Net assembly. As a result, the Implementation Model serves as the roadmap to the source implementation of the system.

It is common for the layers in the Design Model to be packaged differently than the Implementation Model as reusable components are introduced in the Implementation Model.

The CashPro Accelerate application is implemented as four DLLs as depicted in the following diagram:

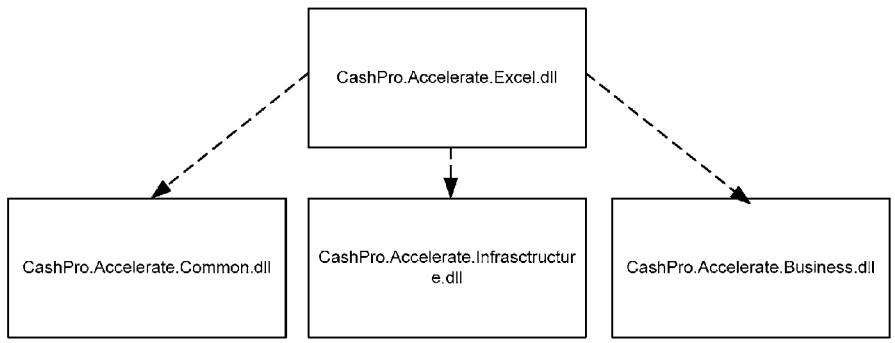

Note that the three logical layers previously discussed are implemented in three .Net assemblies (CashPro.Accelerate.Excel.dll, CashPro.Accelerate.Infrastucture.dll, CashPro.Accelerate.Business.dll). The final assembly (CashPro.Accelerate.Common.dll) contains shared utilities and constants.

The main Infrastructure assembly is subdivided into namespaces as follows:

- CashPro.Accelerate.Backup – All functionality for handling backups of the Accelerate worksheets and associated data files.

- CashPro.Accelerate.Generalledger – All functionality for the General Ledger sheets.

- CashPro.Accelerate.Migrator – All functionality migrating Accelerate 1.0 sheets to version 2.0 of the application.

- CashPro.Accelerate.Updater – All functionality for downloading and installing Accelerate system updates.

- CashPro.Accelerate.DataStore – All functionality for loading and saving data to the local file system.

- CashPro.Accelerate.DataManager – All business logic and process control.

- CashPro.Accelerate.Communicator – All functionality for communicating with the CashPro web service. Utilizes library routines and classes in CashPro.Accelerate.Business.

- CashPro.Accelerate.UI – All shared user interface functionality including the CashPro toolbar and user settings dialog.

CASHPRO WEB SERVICES

Accelerate utilizes the following CashPro web services:

- BAI data download
- Account Information download
- Outstanding Issues download
- Bulletins download
- Currency Information download
- Usage Information upload

SECURITY VIEW

The security view describes how the system implements the security requirements specified in the Detailed Spec. Security design is presented in the following sub-areas.

> User Identification & Authentication – How does the system identify users and verify it is them?

> Authorization – Once authenticated, who is allowed to do what?

USER IDENTIFICATION & AUTHENTICATION

CashPro Excel User Identification can be performed via a login dialog. Actual authentication can be performed by the CashPro web service using credentials passed to it during the web service calls.

AUTHORIZATION

All authorization can be performed by the CashPro web service. Credentials are passed during each request.

DATA ENTITLEMENT

Date entitlement for the CashPro data can be determined by the CashPro web service.

DATA INTEGRITY AND PRIVACY

All downloaded CashPro data, user settings, and any other stored data will be stored in a user's documents folder (i.e. C:\My Documents\CashPro\Accelerate) making it unavailable to other non-administrative users of the system. In addition, all locally stored data can be encrypted to prevent reverse engineering of the application. Rijndael private key encryption can be used for all locally stored data files. This encryption scheme, also known as Advanced Encryption Standard (AES) utilizes a 265-bit private key.

All security of the CashPro data on the communication link can be handled by the CashPro web service which may utilize SSL for all communication with Accelerate.

NON-REPUDIATION & AUDITING

All non-repudiation and auditing can be performed by the CashPro web service. Usage information regarding the Accelerate application can be transmitted to the CashPro web services at the time of each data download.

The following user events can be tracked by Accelerate:

- Workbook opened
- Data downloaded
- Worksheet deleted
- Worksheet added
- Application updated

What is claimed is:

1. One or more computer-readable media storing computer-executable instructions which, when executed by a processor on a computer system, perform a method for retrieving data, said data to populate a spreadsheet, wherein the instructions define a user interface layer, a business layer, and a data layer, the method comprising:
receiving, at the user interface layer, a user selection to update a multi-bank data store, wherein the user selection comprises a request for bank account information data from multiple banks that store bank account information in different proprietary formats;
in response to the selection to update the data store, calling a controller module at the business layer;
in response to calling the controller module, utilizing a first thread that uses the controller module to call a web service module, wherein the first thread further uses the controller module to interact with the user interface layer, an interaction with the user interface layer associated with a rate of response;
in response to the call to the web service module, concurrently utilizing a second thread to interact with the data layer to retrieve the bank account information data, the second thread comprising an independent thread of execution, wherein utilizing the second thread to retrieve data enables the processor to maintain the rate of response for a concurrent interaction with the user interface layer utilizing the first thread; and
utilizing the first thread to use the controller module to populate, in conformance with a business rule residing in the business layer, a spreadsheet application at the user interface layer with retrieved bank account information from the multiple banks, the populating in conformance with a business rule comprising consolidating in the spreadsheet the bank account information from the multiple banks by mapping from the different proprietary formats to a display format for the spreadsheet, wherein the business layer insulates the user interface layer from the design of the data store at the data layer, the business layer insulated from (1) knowledge of the data retrieved from the data layer utilizing the second thread and (2) knowledge of the data presented at the user interface layer utilizing the first thread;
determining a cash position based on the populated spreadsheet;
in response to a user request, reconciling the cash position based on the populated spreadsheet with a cash position forecast determined on a prior date;
determining whether the spreadsheet includes an outstanding issue; and
in response to a determination that the spreadsheet includes an outstanding issue:
identifying an account associated with the outstanding issue;
mapping data associated with the outstanding issue to an ad hoc report, wherein the report presents a plurality of accounts associated with outstanding issue data; and
in response to user selection of an account presented in the ad hoc report, displaying the outstanding issue data associated with the selected account.

2. The method of claim 1 further comprising using the controller to pass bank account information ("Bai2") data to a BaiParser.

3. The method of claim 2 further comprising using the BaiParser to translate Bai2 data into a human-readable format.

4. The method of claim 3 further comprising using the Controller to pass the Bai2 data to a StoreManager module.

5. The method of claim 4 further comprising using a StoreManager to save Bai2 data to a local file system.

6. A system for cash reporting and cash positioning, the system comprising:
a computer memory storing:
a controller module that receives a selection to update a data store, wherein the selection comprises a request for bank account information data from multiple banks that store bank account information in different proprietary formats, the bank account information corresponding to cash amounts in different accounts in the multiple banks; and
a web service module comprising a user interface layer, a business layer and a data layer, the data layer interfacing with the data store, wherein:
the web service module is configured to receive a call from a first thread that utilizes the controller module, the first thread further utilizing the controller module to interact with the user interface layer, an interaction with the user interface layer associated with a rate of response, the call from the controller module being sent in response to the selection to update the data store;
in response to the call from the controller module, a second thread concurrently utilizes the web service module to retrieve the bank account information data, the second thread comprising an independent thread of execution, wherein utilizing the second thread to retrieve data enables a processor to maintain the rate of response for a concurrent interaction with the user interface layer utilizing the first thread; and
the first thread utilizes the controller module to populate a display at the user interface layer by enforcing a business rule upon the retrieved bank account information data from the multiple banks, the business rule residing in the business layer such that the cash amounts from the different bank accounts are consolidated for presentation by the user interface layer, wherein the business layer insulates the user interface layer from the design of the data store at the data layer, the business layer insulated from (1) knowledge of the data retrieved by the second thread and (2) knowledge of the data presented at the user interface layer by the first thread;
the web service module further configured to:
determine whether the consolidated cash amounts include an outstanding issue;
in response to a determination of an outstanding issue:
identify an account associated with the outstanding issue;
map data associated with the outstanding issue to an ad hoc report, wherein the report presents a plurality of accounts associated with outstanding issue data; and
in response to user selection of an account presented in the ad hoc report, display the outstanding issue data associated with the selected account.

7. The system of claim 6 wherein the user interface module populates a client-resident spreadsheet application with retrieved bank account information data.

8. The system of claim 6 wherein the controller module is further configured to pass the bank account information data to a data parser.

9. The system of claim 8 wherein the data parser is configured to translate the bank account information data into a human-readable format.

10. The system of claim 9 wherein the controller module is further configured to pass the bank account information data to a local database.

11. The system of claim 10 wherein the local database is configured to save the bank account information data to a local file system.

* * * * *